(12) United States Patent
Krieg et al.

(10) Patent No.: US 6,261,159 B1
(45) Date of Patent: Jul. 17, 2001

(54) APPARATUS AND METHOD FOR THE RESTORATION OF OPTICAL STORAGE MEDIA

(75) Inventors: Kevin Krieg, 234 N. Ennis Lake Rd., McAllister, MT (US) 59740; Theodore A. Thompson, Bozeman, MT (US)

(73) Assignee: Kevin Krieg, McAllister, MT (US)

( * ) Notice: Subject to any disclaimer, the term of this patent is extended or adjusted under 35 U.S.C. 154(b) by 0 days.

(21) Appl. No.: 09/345,111

(22) Filed: Jul. 6, 1999

(51) Int. Cl.$^7$ ...................................... B24B 49/18
(52) U.S. Cl. .............................. 451/63; 451/285; 451/398
(58) Field of Search .............................. 451/63, 285, 290, 451/364, 398; 15/246, 28, 216, 97 R, 102; 134/6, 33; 369/72

(56) References Cited

U.S. PATENT DOCUMENTS

| | | | |
|---|---|---|---|
| 3,841,031 | * 10/1974 | Walsh ...................................... 51/283 |
| 4,347,689 | * 9/1982 | Hammond .............................. 51/281 |
| 4,449,214 | 5/1984 | Rangabe ................................. 369/72 |
| 4,556,433 | 12/1985 | Clausen .................................... 134/6 |
| 4,654,917 | 4/1987 | Yeung ...................................... 15/97 |
| 4,680,893 | * 7/1987 | Cronkhite et al. ................. 451/67 X |
| 4,709,437 | 12/1987 | Hehn et al. ............................... 15/97 |
| 4,947,029 | 8/1990 | Kurihara et al. ...................... 235/475 |
| 4,947,505 | 8/1990 | Hood ...................................... 15/246 |
| 5,035,087 | * 7/1991 | Nishiguchi et al. ............. 451/285 X |
| 5,069,236 | 12/1991 | Pierson ................................. 134/153 |
| 5,107,880 | 4/1992 | Pierson ................................. 134/902 |
| 5,161,146 | 11/1992 | Chaya et al. ........................... 369/72 |
| 5,228,022 | 7/1993 | Compton et al. ...................... 369/72 |
| 5,456,627 | * 10/1995 | Jackson et al. ..................... 451/63 X |
| 5,537,706 | 7/1996 | Baker ..................................... 15/97.1 |
| 5,733,179 | * 3/1998 | Bauer ................................. 451/63 X |

* cited by examiner

*Primary Examiner*—Joseph J. Hail, III
*Assistant Examiner*—Anthony Ojini
(74) *Attorney, Agent, or Firm*—Workman, Nydegger & Seeley (57) ABSTRACT

A restoration apparatus and method for removing scratches, defects and related imperfections that exist within the surface of an optical storage medium, such as audio, video and/or computer compact discs. The illustrated restoration apparatus includes a support carriage, having an interior portion containing fluids used in the restoration process. The apparatus further includes a retention disk for securing the CD to be restored. The retention disk is supported within a recess formed in the top surface of the support carriage. The recess is fluid tight so that the CD can be placed, and maintained, in fluid contact with various restoration liquids. Also, the retention disk is supported on a bearing surface so that the retention disk and the CD contained therein can freely rotate. The restoration apparatus also includes an arm, attached to the top surface of the support carriage with a hinge, within which is positioned a motor and a polishing head. The arm can be actuated so as to place the polishing head in surface contact with the CD. The polishing head is equipped with a restoration medium, such as an abrasive or a polishing material, to remove defects from the surface of the CD, and then restore the CD to a useable state. Rotation of the polishing head against the surface of the CD causes the CD to rotate in an opposite direction. A method for restoring the surface of a CD is also disclosed. The steps for restoring the CD include removing the protective layer of the CD so as to eliminate any scratches or imperfections that exist therein. Next, a polishing head and a suitable polishing material is used to add a new protective layer to the CD, thereby restoring its useability.

15 Claims, 5 Drawing Sheets

APPARATUS AND METHOD FOR THE RESTORATION OF OPTICAL STORAGE MEDIA

BACKGROUND OF THE INVENTION

1. The Field of the Invention

This invention relates generally to an apparatus and method for restoring storage media. More particularly, the present invention relates to an apparatus and method for removing scratches and similar imperfections from the surface of an optically read storage medium, such as a compact disc (CD), digital video disc (DVD) and the like.

2. The Relevant Technology

Optically read storage media, such as audio, video and computer compact discs (CDs) and the like, are increasingly used as the storage medium of choice for both computer software, audio, and video content. Such media provides an extremely high storage capacity in a relatively small space, and the digital format provides for a superior sound and video quality during playback. CDs and related optically read media are usually constructed by laminating a clear protective layer over a metal disc or base which contains digitally encoded information. The clear protective layer prevents the metal disc or base from being damaged during normal use. Digital information is encoded on the metal disc or base via the formation of "pits" and "lands" that are arranged in a concentric circular track. These pits and lands are used to represent digital information, and thus can be used to store a digitized version of sound, or similar digitized form of information, on the disc.

In operation, the digital information is essentially reproduced from the compact disc by scanning its surface with a laser beam. The scanning laser is focused just below the protective surface of the disc, so that minor imperfections in the protective layer do not effect the transfer of information from the disc. As the beam passes over the surface of the disc, it is reflected by the surface of the metal disc or base. In addition, as the beam is reflected it is also modulated by the pits and lands contained on the metal disc. The modulated laser light is detected by receivers and the digital information represented by the modulation is decoded and converted into a form usable by the particular apparatus containing the disc, such as a computer or compact disc player. As is well known, the digital storage and retrieval of information provides high data quality and reproduction.

While the plastic coating present on most optically read media provides a certain degree of protection, scratches and related imperfections in the coating medium can occur over time and/or from misuse of the medium. These scratches or related imperfections can cause a loss or interruption of data in computer software media, or negatively offset the sound and/or video quality in an audio/video medium. If the coating has a significant number of imperfections, the medium may be completely unusable.

It would therefore be an advance to provide the ability to restore damaged optical storage media. In particular, it would be advantageous to provide the ability to remove scratches and other imperfections that exist in older, or mishandled discs and thereby prolong the life of the disc.

OBJECTS AND BRIEF SUMMARY OF THE INVENTION

Accordingly, it is an overall object of the present invention to provide an apparatus and method for restoring/repairing optical storage media, such as compact discs and the like.

It is another object of the present invention to provide a system and method for removing scratches or related imperfections from the surface of an optical storage medium, and thereby prolong the useful life of the medium.

It is still another object of the present invention to provide a system and method that is able to remove scratches and/or imperfections from the surface of an optical storage medium in a manner such that the medium can be used without any loss of data, sound and/or video quality during playback.

To achieve the foregoing objectives, and in accordance with the invention as embodied and described herein, the present invention is related to a restoration apparatus, and a corresponding method, for restoring the usefulness of optically read storage media. In a preferred embodiment, the restoration involves the removal of scratches, defects and related imperfections that are present on the surface of the optical storage medium, such as compact discs and the like. In particular, the restoration apparatus of the illustrated embodiment is configured so as to remove imperfections that may exist on or within the protective layer, which is present on most optically read storage media. Moreover, the imperfections are removed in a manner so as to preserve the integrity of the digital data embodied within the metal base.

Briefly summarized, a restoration apparatus constructed in accordance with the teachings of the present invention includes a retention means for retaining an optically readable storage medium in a manner such that the media is held in at least partial fluid communication with a fluid (or fluids) used during the restoration process. The retention means is comprised, for example, of a retention disk having an interior portion for receiving the storage medium. The retention disk is attached to the main support housing surface within a fluid-tight channel in a manner so that the retention disk, and the storage medium, can rotate freely on a bearing surface.

A preferred embodiment of a restoration apparatus further includes means for removing scratches, defects and related imperfections from the surface of the storage medium contained within the retention means. In an illustrated embodiment, the scratch/defect removal means is implemented as a polishing head that is capable of being placed in contact with at least a portion of the storage medium surface. In addition, the polishing head manipulates a polishing medium against the storage medium's surface so as to remove a sufficient amount of protective layer and thereby remove scratches, defects and/or other surface imperfections. In a presently preferred embodiment, the polishing head is a circular member that can be rotated for instance by an electric motor. The polish head has a rotating surface to which can be secured different types of polishing mediums for sanding and/or polishing the surface of the storage medium.

In one preferred embodiment, the polishing head, a corresponding rotating shaft and the electric motor are all positioned within a housing formed as an arm assembly. The arm assembly is movably attached to the main support housing surface in a manner so that the polishing head can be selectively placed in contact with the surface of the storage medium when it is secured within the retention disc. In a preferred embodiment, the polishing head is positioned within the arm assembly so that it is capable of being placed against the surface of the storage medium in a non-concentric manner. In this way, when the polishing head rotates against the surface of the storage medium, the resulting force causes the storage medium and the retention disc to freely rotate in a direction opposite to that of the polishing head. This provides a more efficient removal of the protective layer and accelerates the restoration process.

Also, in one preferred embodiment, the control of the restoration apparatus is accomplished via an electronic control panel, and corresponding electronics, that is positioned on the surface of the main support housing. The control panel can perform such functions as lowering and raising the arm assembly, controlling the speed of the motor and the rotating polishing head, controlling the time of any particular stage of the restoration process, electronically providing instructions to the operator of the restoration apparatus, etc.

In addition to a restoration apparatus that can be used for the restoration of a storage medium, the present invention is also directed to a novel method for the restoration of an optical storage medium. The process can be used in connection with the above-described apparatus, or may also be used in connection with other types of equipment and/or devices. The first step involves the application of a sufficiently abrasive medium to the surface of the optical storage medium so as to remove at least a portion of the protective layer that overlays and protects the underlying recording medium. This protective layer is removed until all of the scratches, defects or related imperfections that were present within the protective layer are removed. Preferably, this scratch removal portion of the process is performed in the presence of a lubricant, such as deionized water, so that the surface of the storage medium is not overly scarred while the protective layer is removed.

Once a sufficient amount of the protective layer has been removed from the surface of the storage medium, a second step is performed. This step involves the application of a polishing material to the surface of the storage medium so as to add a new protective layer to the surface of the medium. In this step, a polishing head equipped with a suitable polishing component is preferably used to uniformly polish and restore the storage medium surface. At the conclusion of this step, any imperfections that previously existed within the surface of the disc, or related storage medium, have been removed. Also, a sufficient protective layer has been retained so as to protect the disk from future scratches and imperfections. The disc is then usable in its intended manner.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
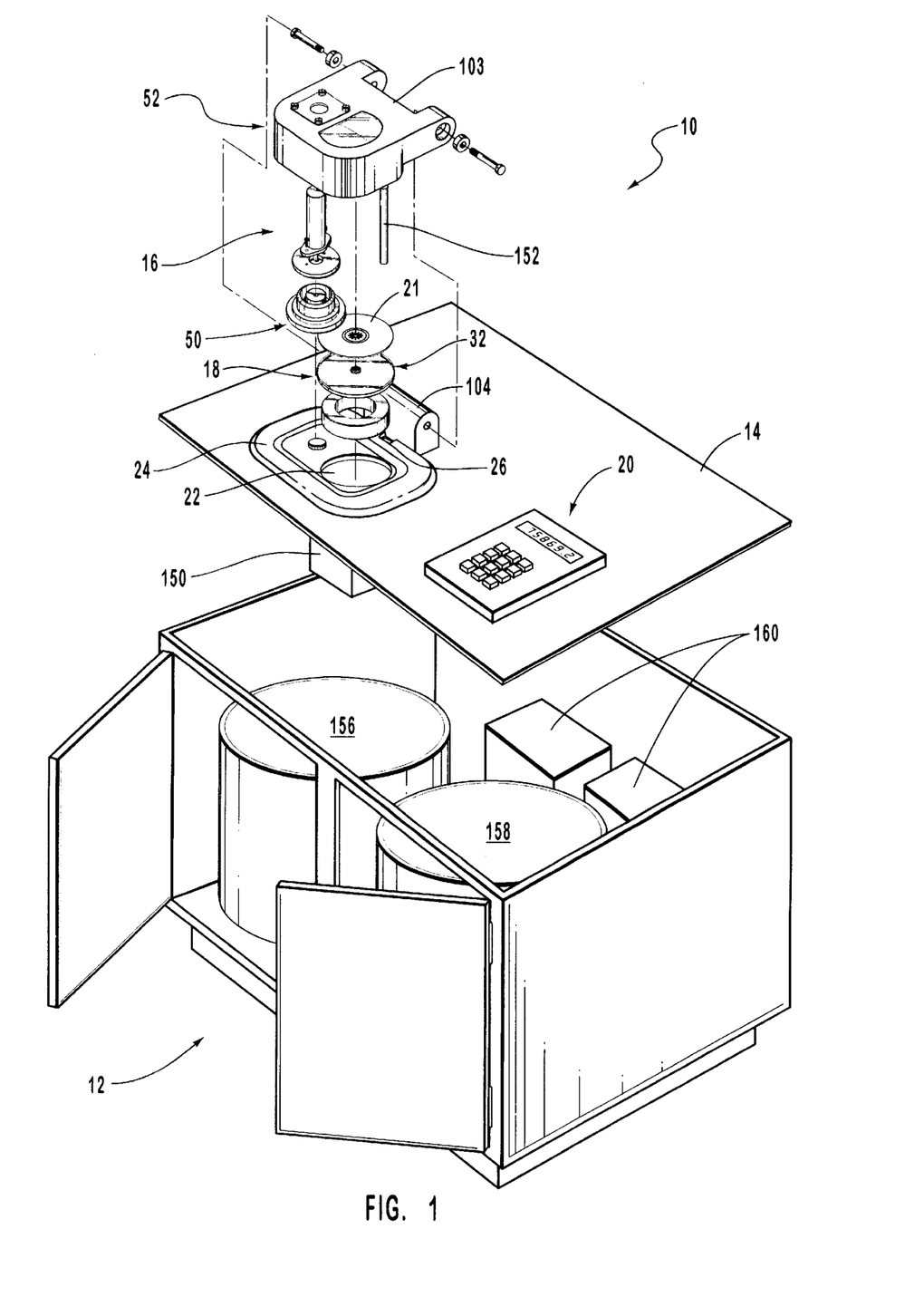
FIG. 1 is an exploded perspective view of a restoration apparatus.

Reference is now made to the drawings, which illustrate one presently preferred embodiment of the apparatus and method of the present invention. FIG. 1 illustrates an exploded, perspective view of an example of a restoration apparatus, designated generally at 10, that is constructed in accordance with the teachings of the present invention. The restoration apparatus 10 can be used to remove scratches and similar imperfections or defects from an optical storage medium such as a compact disc (CD) used to store audio and/or computer data. It will be appreciated that the device 10 could be used for any type of similar optical storage medium, such as a Digital Video Disc (DVD) and the like. Preferably, the apparatus includes a retention means for retaining an optical storage medium that is to be restored, such as a CD, in a manner such that the medium is held in at least partial fluid communication with any fluids used during the restoration process. In addition, the apparatus preferably includes means for removing scratches, defects and related imperfections from the surface of the storage medium and for polishing the surface in a manner so as to restore and/or improve the usability of the medium. The apparatus also preferably includes a support means for providing structural support to the retention means and the scratch removal and polishing means. Optionally, the support means defines an interior housing for storing fluids and/or other materials used in connection with the restoration process. In addition, the apparatus may include an electronic control means for electronically controlling the operation of the scratch removal and polishing means and/or other functioning aspects of the restoration apparatus. In the illustrated embodiment, restoration apparatus 10 includes a rectangular carriage frame 12 upon which is mounted a baseplate 14. Operatively mounted to baseplate 14 is a disc polishing assembly, designated generally at 16, and a disc retention assembly, designated generally at 18. Optionally, an electronic control panel 20, may also be coupled to baseplate 14. The above elements will be described in further detail below.

FIG. 1 illustrates, by way of example and not limitation, how the support means may be implemented as a carriage frame 12. As is shown, carriage frame 12 is configured to provide support to the various components of the restoration apparatus. In the illustrated embodiment, carriage frame 12 has a generally rectangular form, and a horizontal baseplate upon which are positioned the various components of the apparatus. In addition, frame defines a hollow interior portion, which can be used to store materials and additional apparatus needed in connection with the operation of the restoration apparatus 10. For instance, in the preferred embodiment, fluids used in connection with the restoration of a disc are stored in two tanks, 156 and 158, that are contained within the housing. The contents of the tanks, which will be discussed in further detail below, are drawn by fluid pumps, shown at 160. Any well known type of fluid pump can be used to provide this function. Optionally, carriage 12 may include wheels or rollers (not shown)

attached to the bottom to provide mobility. It will be appreciated that other support and housing configurations could be used and may have various dimensions and sizes as necessary to accommodate a user, the optical storage medium, and the other components of restoration apparatus 10.

FIG. 1 further illustrates one example of a structure used for implementing electronic control means in the form of an electronic control panel and circuitry 20. Electronic panel 20 provides a mechanism to control and vary the operational characteristics of restoration apparatus 10. Electronic panel 20 is formed from commonly known electrical circuitry, such as a programmable integrated circuit and the like. A liquid crystal display (LCD) is attached to the panel to provide a visual representation of the operation of restoration apparatus 10. This integrated circuit modifies the operation requirements, such as, but not limited to, time, rotational speed, fluid flows, and the like, all of which will be described below in connection with the description of the operation of the restoration apparatus 10. Electronic panel 20 may have various other forms which can perform the same function, such as analog circuits, and the like.

FIG. 1 further illustrates one example of a structural configuration that can be used to implement the function provided by retention means. The structure includes a fluid tight recess 22, and a disc retention assembly 18. As is shown, the baseplate 14 is provided with a recess 22 and a corresponding sealing member 24 which surrounds recess 22. Sealing member 24 has a generally rectangular shape. The underside flat portion of sealing member 24 is coupled to baseplate 14 in a manner so as to form a fluid tight seal between sealing member 24, recess 22 and baseplate 14. As will be discussed further, this prevents any fluid from escaping during the restoration operation. Sealing member 24 may be formed from various materials that are capable of forming a seal when in cooperation with polishing assembly 16. In a preferred embodiment, sealing member 24 is comprised of a rubber, or rubber-like material.

The disc retention assembly 18 is shaped and sized so as to be received within recess 22. Moreover, retention assembly 18 is implemented so as to retain a storage medium, i.e., a C.D., in a manner such that the disc is permitted to freely rotate. As shown in greater detail in FIG. 2, disc retention assembly 18 includes a bearing assembly 30 and a retention disc 32. Bearing assembly 30 is removably and operatively received within recess 22. Bearing assembly 30 allows free rotational movement of the retention disc 32, and the disc retained therein, during operation of the restoration apparatus. In the illustrated embodiment, bearing assembly 32 is comprised of a precision roller bearing 31 having a low drag coefficient. Roller bearing 31 has an aperture 34 for operatively receiving a corresponding lower portion 40 formed on retaining disc 32. The roller bearing 31 is inserted into the recess 22 such that its center rotational axis is substantially perpendicular to the horizontal plane formed by baseplate 14. Alternative bearing structures could also be used, including ball bearings, sealed or non-sealed bearings, or any similar structure that provides for the free rotation of retention disc 32. Additionally, roller bearing 31 may be formed from various types of material, including but not limited to, aluminum, stainless steel, metals, alloys thereof, composites and polymers.

Figure 2:
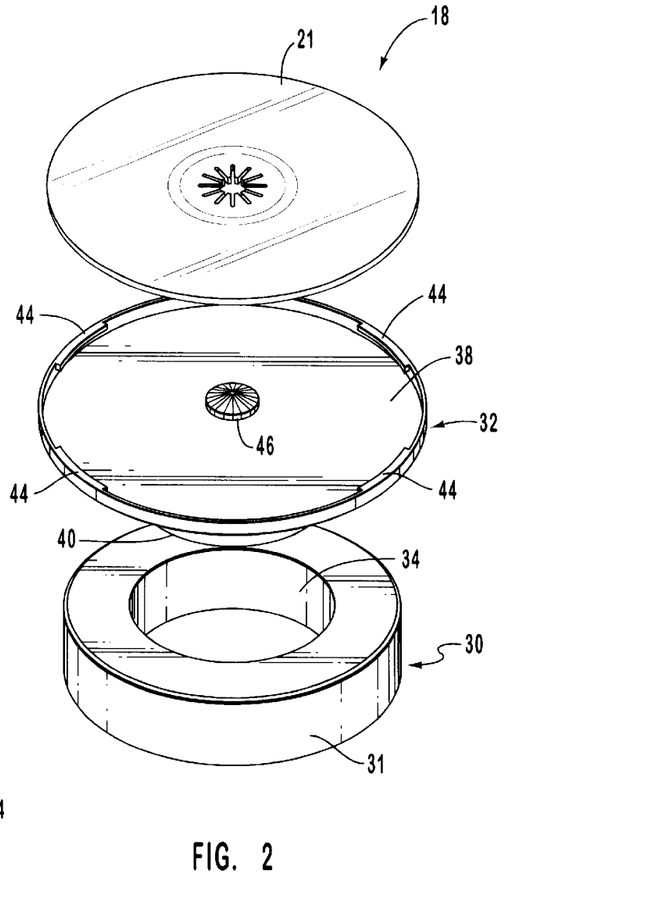
FIG. 2 is an exploded perspective view illustrating in further detail the restoration apparatus in FIG. 1.

With continued reference to FIG. 2, it is shown that in one preferred embodiment the retention disc 32 has an upper plate 38 and a lower portion 40. Upper plate 38 is configured with a plurality of support flanges 44 and a seating post 46 located at the center. Support flanges 44 are located around the peripheral edge of upper plate 38, so as to hold the edge of the medium during the restoration process. Other support structures could be used in place of the illustrated flanges 44. Alternatively, upper plate 38 does not include support flanges 44 and can be instead coated with a non-slip, non-abrasive finish to securely hold a CD in place.

Seating post 46 is configured and sized so as to receive and retain the center of a CD disc. In one embodiment, seating post 46 has a generally cylindrical form with a conical or cone-like protrusion extending from the top thereof. The protrusion aids in guiding and positioning the CD upon upper plate 38. In another configuration, seating post 46 may be replaced with a wing-nut and bolt type assembly so as to more securely retain the CD disc. Of course, if a different medium is being restored, then a different retention assembly/configuration would be used.

The lower portion 40 of retention disc 32 has a generally cylindrical form and is coupled to the bottom surface of upper plate 38 so as to be substantially concentric with upper plate 38. Lower portion 40 is sized to slip fit within bearing assembly 30 to allow free rotational movement of the disc retention disc 32. Specifically, lower portion 40 fits within aperture 34 of the bearing 31. Lower portion 40 may have different configurations dependent upon the corresponding shape, size and configuration of bearing assembly 30.

In general, retention disc 32 may be formed from various types of material that have sufficient strength and rigidity to withstand the rotational forces applied thereto. Such materials include, by way of example and not limitation, aluminum, metals, polymers and composites.

Reference is again made to FIG. 1, which illustrates one presently preferred structure that can be used to implement a means for removing scratches, defects and related imperfections from the surface of a storage medium, and for polishing and finishing the surface in a manner so as to restore the usability of the medium. One structure for providing this function is polishing assembly, designated generally at 16. Polishing assembly 16 includes a polishing head 50, which, in operation, can be positioned against the surface of the storage medium by way of an arm assembly 52, and then be used to remove damaged portions of the medium's protective surface and/or polish the surface.

Figure 3:
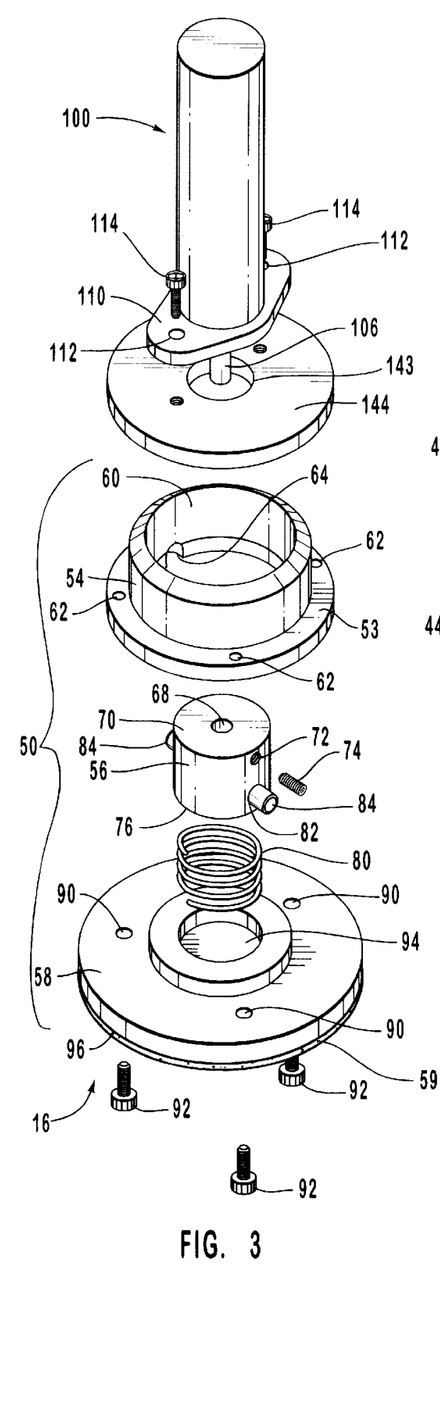
FIG. 3 is an exploded perspective view of a polishing assembly of the restoration apparatus in FIG. 1.

FIG. 3 is an exploded view illustrating details of one presently preferred embodiment of the polishing assembly 16. As is shown, polishing head 50 includes a cap 54, a torque converter 56, and a polishing disc 58. Cap 54 has a generally cylindrical form with a hole 60 formed through it that is substantially concentric with the longitudinal axis of cap 54. Cap 54 is also provided with a plurality of apertures 62 located radially around a peripheral edge 53 of cap 54. These apertures 62 are used to interconnect cap 54 with polishing disc 58, via corresponding holes 90 formed on the polishing disc 58 and any appropriate securing means, such as the screws 92 that are illustrated in FIG. 3. Formed is within hole 60 are notches 64, one of which can be seen in FIG. 3, which receive correspondingly shaped arms 84 that are formed on the torque converter 56.

When assembled the torque converter 56 is inserted within the correspondingly shaped hole 60 formed within cap 54. The cap 54 and torque converter 56 are then attached to arm assembly 52. For instance, in the illustrated embodiment, a first hole 68 is formed partially through the center of torque converter 56. First hole 68 provides a means for attaching to arm assembly 52 shown in FIG. 1, by way of a threaded pin 74 that can be inserted through threaded hole 72 so as to engage rotating shaft 106 when received within first hole 68. Other approaches for attaching torque convertor 56 to arm assembly 52 could also be used.

A second hole (not shown) is formed through bottom end 76 of torque converter 56 to retain a spring 80, or any similar means for maintaining a biasing force against polishing disc 58. Additionally, a pair of locking pins 84 are attached to opposing sides of converter 56 and are positioned so as to be received within the corresponding inner recesses 64 when torque convertor 56 is inserted within cap 54.

Polishing disc 58 is configured to connect with cap 54 so that torque converter 56 is securely held within longitudinal hole 60 of cap 54. In the illustrated embodiment in FIG. 3, polishing disc 58 has a generally cylindrical form with a number of threaded connector holes 90 therethrough. Connector holes 90 are aligned with the plurality of threaded apertures 62 on cap 54, so that polishing disc 58 can be connected with cap 54 via threaded screws 92. A recess 94 is formed within the top surface of disc 58 that is sized and configured to matingly receive spring 80 and prevent any lateral movement of the spring 80 during rotation.

Polishing disc 58 has a generally planar bottom surface 96, which allows different polishing and finishing materials, such as polishing pads, sanding pads and the like, to be releasably attached therto, such as an abrasivd or polishing pad 59. In one configuration, a high density foam pad is adhered to bottom surface 96 to act as a buffer between the polishing and finishing materials and the surface of polishing disc 58. Each polishing or finishing material is adhered to the high density foam pad and securely retained thereto. There are various other configurations to attach the polishing and finishing materials to polishing disc 58 in a secure manner. For instance, VELCRO®, or any other suitable attachment means could be used.

Assorted types of polishing/finishing restoration pads 59 may be attached to the bottom surface 96 of polishing disc 58, depending on the sort and stage of the restoration process being performed. For example, commonly used materials may be three to nine micron abrasive pads, non-abrasive pads where the fibers may assimilate an abrasive solution, sandpaper or abrasive pads having grit of 2,000, a 100 percent cotton cloth or greater, or other similar materials. It is preferred that an abrasive pad having a grit of 2,000 or greater is used during a portion of the restoration process while a non-abrasive pad which has fibers which can assimilate a polishing solution may be used during the another stage. Other similar materials which will provide similar desired results are appropriate, and are known by one skilled in the art.

In general, the polishing head 50 is formed to withstand the rotational forces applied thereto during the restoration process. The polishing head 50 can be formed from various types of material that include, by way of example and not limitation, aluminum, metals, polymers and composites. It is preferred that polishing head 50 be substantially formed from aluminum.

Figure 4:
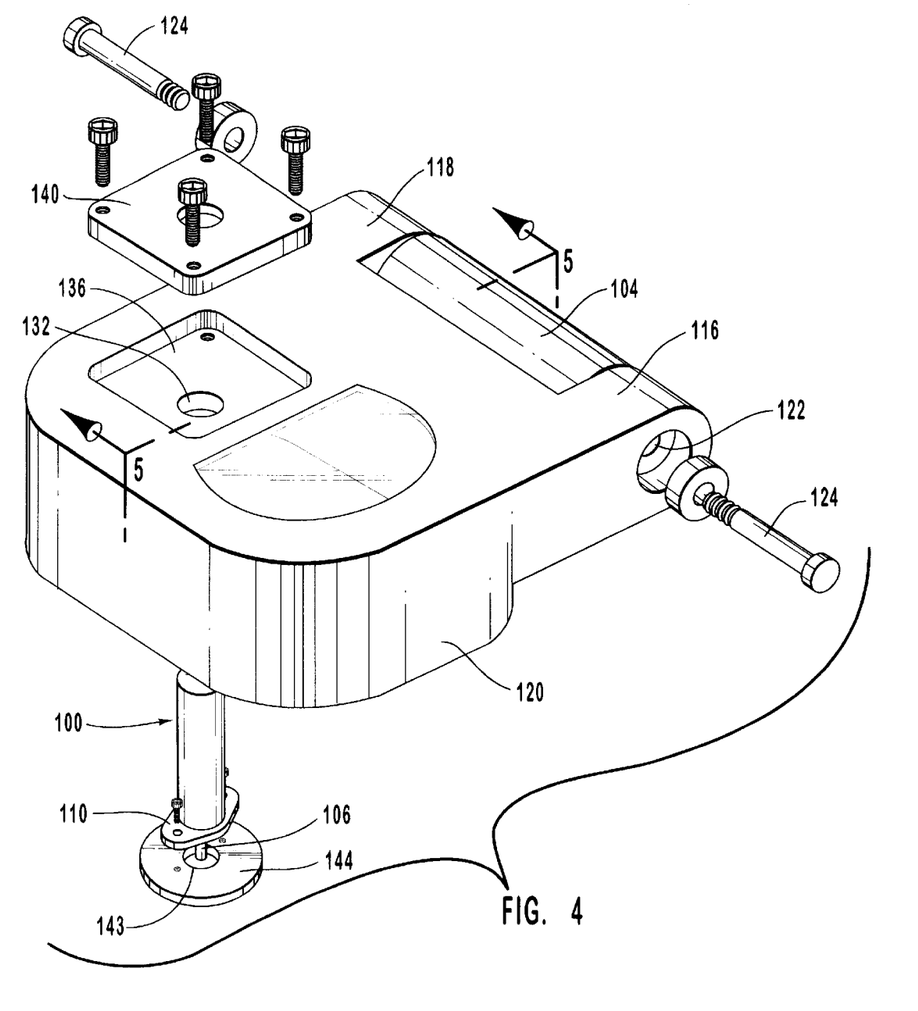
FIG. 4 is an exploded perspective view of an arm assembly of the restoration apparatus in FIG. 1.
Figure 5:
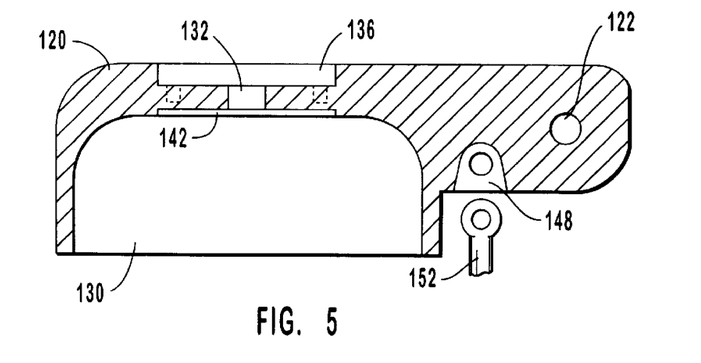
FIG. 5 is a cross-sectional side view of the arm assembly of the present invention.

In the illustrated embodiment, polishing assembly 16 is further comprised of an arm assembly 52 which is shown in FIG. 1, and in further detail in FIGS. 4 and 5. Arm assembly 52 preferably includes means for operatively manipulating the polishing assembly in a manner so as to cause the polishing disc 58 to be operated against the surface of the storage medium. In the illustrated embodiment, the manipulation means is comprised of an electric motor 100. However, it will be appreciated that other structures could be used, including manual hand cranks, and the like. The arm assembly 52 further includes, in a preferred embodiment, a main body 120 and a hinge 104. Motor 100, in one illustrative configuration, is a motor that is capable of rotating, or otherwise operatively manipulating the polishing assembly 50 during a restoration process. In a preferred embodiment, the motor is electric, can generate 1/10–1/25 horsepower, and is capable of rotating the polishing head 50 at from about 1000 revolutions per minute (rpm) to about 2,500 rpm. Motor 100 has a generally cylindrical form with a rotating shaft 106 at a first end 108 which is configured to connect with hole 68 of torque convertor 56, as previously described. Additionally, a motor flange 110 is located at first end 108 to connect with a lower retention plate 144 thereby securing motor 100 within body 120, as described below. Motor flange 110 is formed with flange apertures 112 therethrough to accommodate connectors 114, such as threaded bolts or the like. Motor flange 110 may have various other forms known by one skilled in the art. Additionally flange apertures 112 and connectors 114 may vary as described previously with respect to connector 92. It will be appreciated that various other types of motors or driving arrangements would also be effective in manipulating the polishing assembly 50. Moreover, manipulation of the polishing assembly may be accomplished in a manner other then rotation. For instance, the polishing disk could be applied to the surface of the storage medium in a lateral motion, instead of a rotational motion.

The main body 120 of the arm assembly 52 has two arms 116 and 118, that are each formed with an aligned bore 122, and through which an arm connector 124 can freely pass so as to form hinge 104. Any similar type of hinged relationship could be used. As is best seen in the cross-sectional view of FIG. 5, the main body 120 of the arm assembly 52 has a cavity 130 formed within its interior. Cavity 130 is shaped and sized so as to enclose the polishing head assembly 50. Main body 120 is further provided with a motor interior housing 132, which is formed through the top portion of main body 120 and which is sized and shaped so as to enclose and secure motor 100. In the illustrated embodiment the motor assembly 100 is secured with a top motor retention plate 140 positioned within a retention recess 136, as is shown in FIG. 4. Similarly, a lower motor retention plate recess 142 and a lower motor retention plate 144 are used to secure the bottom of the motor 100 within interior housing 132. As is shown in FIG. 4, a passage 143 is formed within the lower motor retention plate 144, which allows the rotating shaft 106 to pass through for connection to the polishing head assembly 50. Both motor recesses 136 and 142 function so as to retain the motor 100 within the motor housing 132 in a manner so that the motor can be easily accessed and removed if needed.

It is appreciated, however, that motor recesses 136 and 142 and associated retention plates 140 and 144 may have various other dimensions as necessary to perform the function of securely or detachably retaining the motor 100, so long as they cooperate with each other. For example, the dimensions and shapes of plates 140 and 144, and recesses 136 and 142 may vary depending on the particular physical configuration of the motor 100.

Referring again to FIGS. 4 and 5, in an optional embodiment, main body 120 is provided with a notch 148 formed within the main body 120. Notch 148 can be used to receive an actuator strut 152 that is connected to and manipulated by a linear actuator 150, represented in FIG. 1. Movement of the strut 152 causes corresponding movement of the main body 120. When placed in a closed position, the main body 120 is positioned against baseplate 14 and sealing member 24 so as to form a sealed cavity about the storage medium positioned within the retention disk 32. Control of the linear actuator 150 and strut 152 can be performed electronically via the electronic control panel 20. It is appreciated that other configurations of main body 120, linear actuator 150 and actuator strut 152 will also perform the intended function thereof, i.e., the opening and closing of the main body 120. Alternatively, movement to the main body 120 can be performed manually by the user.

The arm assembly 52, and more specifically the main body 120 and the hinge 104 are formed to endure the forces applied thereto by motor 100 during the restoration process. As such the main body 120 and the hinge 104 can be manufactured from various types of materials that include, by way of example and not limitation, aluminum, metals, polymers and composites. It is preferred that the main body 120, the hinge 104, and the associated component parts of arm assembly 52 be substantially composed of aluminum.

As is shown in FIGS. 1 and 4, hinge 104 has a generally rectangular form with a curved upper surface to accommodate the corresponding hinged surface (103 in FIG. 1) of the main body 120 during rotation thereof. It can be appreciated that various other configurations of hinge 104 could also be used, or any similar type of arrangement that permits the arm assembly 52 to be opened and closed, so as to place the polishing head 50 in surface contact with the storage medium.

Figure 6:
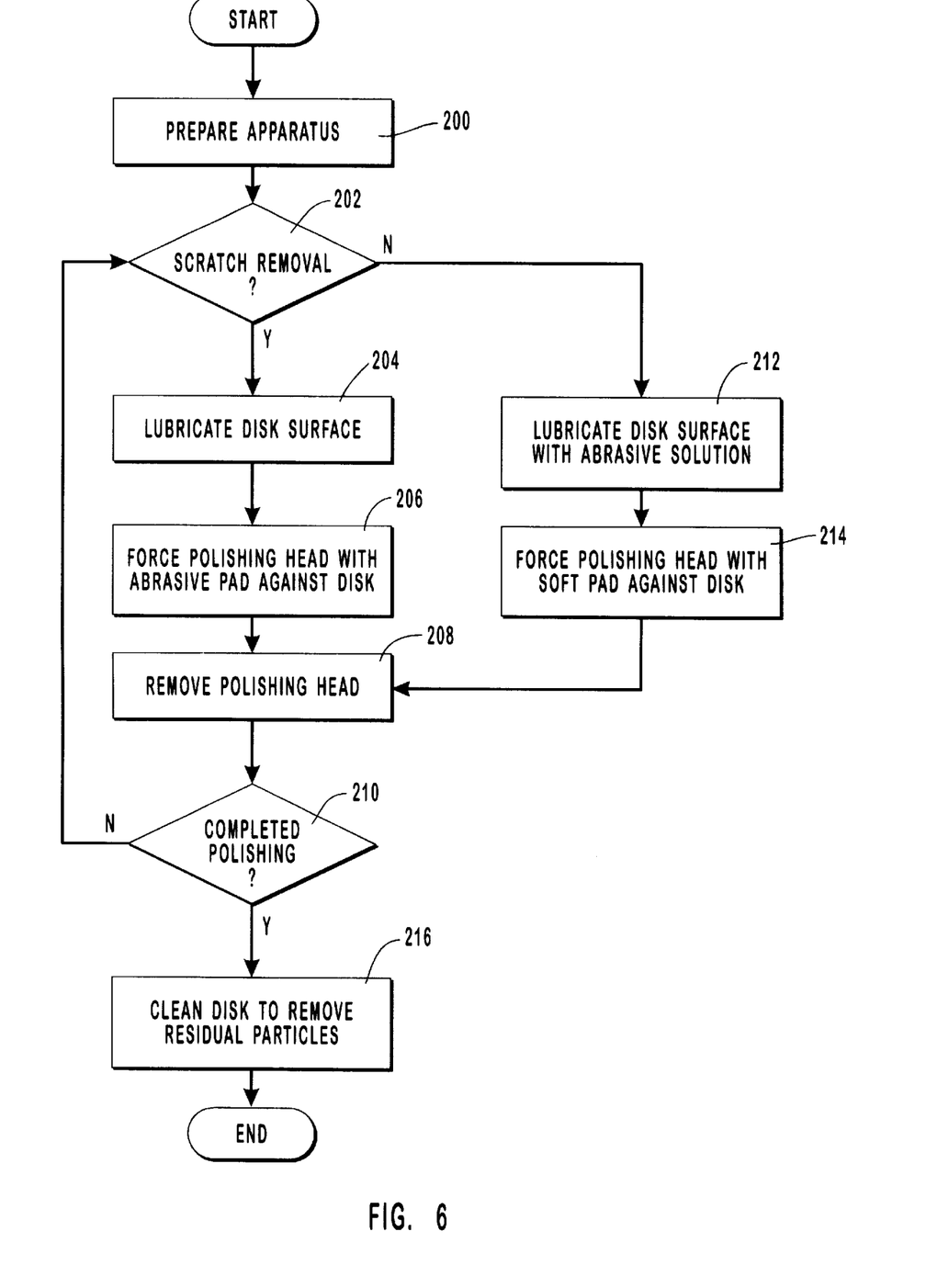
FIG. 6 is a flow chart illustrating one presently preferred series of steps for restoring storage medium.

Reference is next made to FIG. 6, which illustrates in flow-chart form, one presently preferred method for restoring an optical storage medium, such as a compact disc. While in the illustrated embodiment the method is performed in connection with the above-described restoration apparatus 10, the method could be practiced by using other equipment as well.

Step 200 corresponds to the preliminary steps for setting up the restoration apparatus. For instance, a user may first verify the levels of fluids contained within tanks 156 and 158 within the carriage frame 12 to assure there are sufficient amounts to restore an optical disc. As previously noted in connection with FIG. 1, carriage 12 contains two storage tanks that contain materials used in connection with the restoration process. In a preferred embodiment, first tank 156 is filled with aluminum oxide solution ($AlO_2$) having particulates with a diameter ranging from about 1.5 microns to about 4.5 microns, while second tank 158 contains deionized water. In a preferred embodiment, an $AlO_2$ solution manufactured by Coburn Optical of Norman, Okl. is used for the solution contained within the first tank 156. It will be appreciated that other similar polishing solutions could also be used.

While not shown in the figures, tanks 156 and 158 may contain stirring paddles, which can be used to maintain the temperature of the solutions during the restoration process. Preferably, the solutions are drawn from the bottom of the respective tanks by way of conventional fluid pumps 160, which are denoted in FIG. 1. In addition to checking the fluid levels, other initialization steps that correspond with block 200 may include a visual verification that there are no leaks in sealing member 22. Also, at step 200, a user will place and secure the damaged CD 21, or similar optical storage medium within the disc retention assembly 18, in a manner previously described.

Once the equipment has been properly set up, and the damaged disc 21 is in position, the restoration procedure continues as is indicated at query block 202. At this step, a procedural loop is entered wherein the user determines which operations need to be performed on the damaged CD 21. In this regard, there are typically two operations that will be performed on a damaged disc. The first is the defect or scratch removal process, which is the series of steps beginning at functional block 204. The second is the finishing or polishing process, which is the series of steps beginning at functional block 212. Typically, the defect or scratch removal portion of the process will be performed on a disc first, which is then followed by the finishing or polishing aspect of the process. However, depending on the condition of the disc surface, there may be circumstances where only the polishing/finishing aspect of the process will be performed.

Thus, if it is determined at step 202 that a portion of the protective surface of the disc should be removed as an initial step, the user will proceed to process step 204. At that step, the CD's surface is lubricated so as to prevent the surface of the CD 21 from being marred or scored by the polishing head 50. In the illustrated embodiment, the lubricant applied to the surface of the disc is deionized water from tank 158, For instance, a predetermined amount of the lubricant will be pumped from tank 158 into the retention disc 32 so that the surface of the disc is covered. Various other surface lubricants may be used so long as they prevent marring or scoring of the CD 21 by the polishing head 50.

Once the surface of the disc has been properly lubricated, step 206 is performed. In that step the polishing head 50 is fitted with an abrasive defect removal pad (not shown), and then positioned against the surface of the CD 21. This is accomplished, for example, by moving the arm assembly 52 into a closed position via hinge 104. This could be done manually by the user, or via automatic movement of the linear actuator 150, as previously described. Hence polishing head 50 is positioned against the CD.

Figure 7:
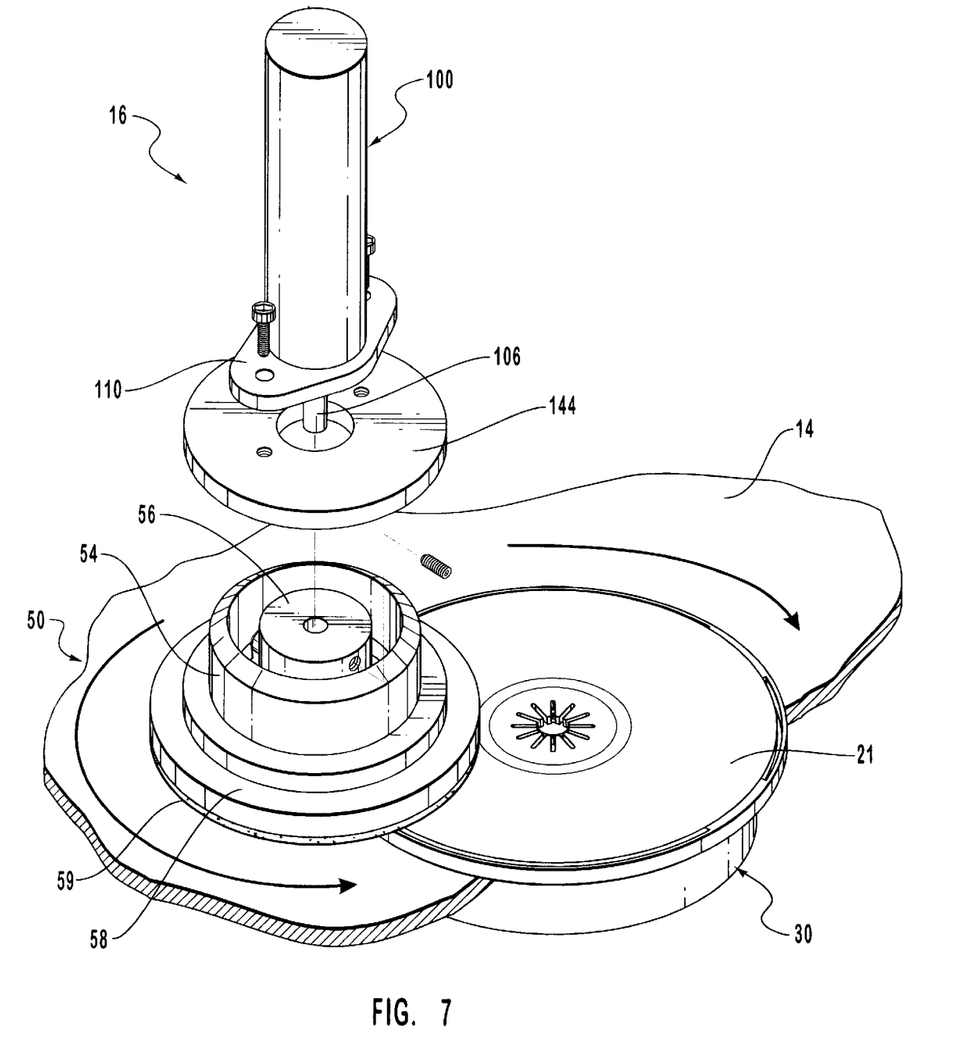
FIG. 7 is an exploded perspective view illustrating one preferred example of the operation of the restoration apparatus.

Once the polishing head 50 is positioned against the surface of the disc, step 208 is performed, which involves rotating the polishing head 50. This is performed, in one embodiment, through the use of motor 100 that resides within the interior of the main body portion 120 of the arm assembly 52. As previously discussed, any motor can be used that is capable of operating between about 1/10th to about 1/25th horsepower, and that is capable of rotating the polishing head 50 from about 1000 rpm to about 2500 rpm. As polishing head 50 rotates, a kinetic force is applied between the CD and the abrasive material attached to the bottom of polishing head 50 such that the CD rotates in the opposite direction to the rotation of polishing head 50. This mode of operation is depicted in FIG. 7. As both polishing head 50 and the CD rotate, a small portion of the protective layer of the CD is removed.

While different rotational speeds would work, in a preferred embodiment, the polishing head 50 is rotated in this step at approximately 1,000 rpm. Also, as polishing head 50 rotates, a continuous stream of deionized water (or equivalent lubricant) is preferably jetted across the surface of the CD to prevent additional marring or scoring. The rotating head 50 is applied to the surface of the disc until enough of the protective plastic surface has been removed so as to eliminate any scratches or related surface imperfections. Once an appropriate amount of the protective layer has been removed, step 208 is performed, and the abrasive polishing medium is removed from the polishing head 50, and the lubricant is removed from the surface of the CD. The process then proceeds as is indicated in functional block 210.

At process step 210, if the polishing and finishing steps beginning at functional block 212 have not yet been performed, then the process continues at step 212.

At step 212, the surface of the CD is lubricated/coated with a polishing solution. In one preferred embodiment, the polishing solution is formed of a liquid which will polish the surface of the CD as a polishing pad (not shown) is rotated, or otherwise manipulated against the surface of the CD. For example, the solution can be comprised of an optical grade polycarbonate polish, such as an $AlO_2$ solution having particulates of approximately 1.7 microns. Other solutions of this sort could also be used so long as the particular diameter ranges from about 1.5 microns to about 4.5 microns.

As before, in the illustrated embodiment, the lubricant is solution within tank 158, and is applied to the disc 21 surface with a pump, designated at 160.

Once the surface of the disc is appropriately coated with the polishing solution, step 214 is performed. In this step, a soft, non-abrasive polishing pad (not shown) is secured to the face of the polishing head 50. Next, the face of the polishing head 50, along with the attached polishing pad is placed against the surface of the CD. This step is performed in substantially the same manner as described above with respect to the step 206. Once the polishing head 50 is positioned against the CD, polishing head 50 is then rotated (or otherwise manipulated) as defined previously in connection with step 208. Again, while different rotational speeds would suffice, in a preferred embodiment the polishing head is rotated at approximately 2,000 rpm in this step. Polishing solution is added to the surface of the CD until a sufficient amount has been applied to the CD so as to form a new protective layer of a desired thickness. Once the polishing/finishing steps have been completed, the process continues at step 216.

Step 216 involves, in one preferred embodiment, bathing the CD in a bath of deionized water. That deionized water removes any residual particles which may remain on the surface of the CD after the defect removal and polishing steps have been completed. In an alternative embodiment, the residue is removed with deionized water and a second polishing step is performed, using a 100 percent cotton cloth and, optionally, a polish material. For example, a polish used in the second polishing step can be Enviro-Guard Wash'N Dry™. Other similar types of polishes could also be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A restoration apparatus for removing surface defects that exist in a top surface layer of an optical storage medium, the restoration apparatus comprising:
   a retention structure sized and shaped so as to detachably receive an optical storage medium and contain a predetermined amount of fluid restoration material, and wherein the retention structure allows for rotation of the storage medium;
   a polishing head having a surface to which can be selectively attached a restoration material and operatively manipulated against at least a portion of the surface of the optical storage medium.

2. An apparatus as recited in claim 1, further comprising means for providing structural support to the storage retention means, the surface removal means and the polishing means.

3. An apparatus as recited in claim 1 further comprising an interior housing containing at least one fluid restoration material for use in connection with the restoration of the optical storage medium.

4. An apparatus as recited in claim 1, further comprising electronic control means for electronically controlling the operation of the restoration apparatus.

5. An apparatus as recited in claim 1, wherein said retention structure comprises:
   a retention disk having an interior that is sized and configured so as to detachably receive the optical storage medium;
   a bearing assembly, operably attached to the retention disk in a manner so as to permit free rotation of the retention disk when the optical storage medium is received therein; and
   a fluid tight recess capable of receiving the retention disk and the bearing assembly so that the optical storage medium received within the retention disk is capable of being placed in at least partial fluid communication with the fluid restoration material.

6. An apparatus as recited in claim 1, wherein the restoration material includes at least one of the following: an abrasive material and a polishing material.

7. An apparatus as recited in claim 1 further comprising an arm assembly having an interior housing sized and shaped so as to contain the polishing head, and wherein the arm assembly is movably attached to a support surface so that the arm assembly can be used to selectively place the polishing head, and the selectively attached restoration material, against at least a portion of the surface of the optical storage medium.

8. An apparatus as recited in claim 1, further comprising an electric motor that is capable of rotating the polishing head, and the selectively attached restoration material, against at least a portion of the surface of the optical storage medium.

9. An apparatus as recited in claim 1, wherein rotation of the polishing head against the surface of the optical storage medium causes a rotation of the retention disk and the optical storage medium in a rotational direction that is opposite to that of the polishing head.

10. A method for removing defects from the surface of an optical storage medium, the method comprising the following steps:
    positioning the optical storage medium so that the surface of the storage medium is in fluid communication with a lubricant;
    manipulating an abrasive restoration medium against the surface of the storage medium so as to remove at least a portion of the surface and thereby remove defects that exist within the surface;
    removing the lubricant from surface contact with the storage medium;
    positioning the optical storage medium so that the surface of the storage medium is in fluid communication with a polishing solution; and
    manipulating a non-abrasive polishing medium against the surface of the storage medium for a time sufficient to add a new protective layer to the surface storage medium.

11. The method as recited in claim 10, further comprising the step of removing any residual particles that remain on the surface of the storage medium following the defect removal and polishing steps.

12. The method as recited in claim 11, wherein the step for removing residual particles comprises washing the surface of the optical storage medium with a water-based solution.

13. The method as recited in claim 10, further comprising the step of polishing the surface of the storage medium with a polishing medium.

14. A restoration apparatus for removing surface defects that exist in a top surface layer of an optical storage medium, the restoration apparatus comprising:

- a retention disk having an interior that is sized and configured so as to detachably receive the optical storage medium;
- a bearing assembly, operably attached to the retention disk in a manner so as to permit free rotation of the retention disk when the optical storage medium is received therein;
- a fluid tight recess capable of receiving the retention disk and the bearing assembly so that the optical storage medium received within the retention disk is capable of being placed in at least partial fluid communication with the fluid restoration material;
- means for removing at least a portion of the top surface layer of the storage medium so as to remove at least some of the defects that exist within the top surface layer; and
- means for polishing the top surface of the storage medium so as to restore the usability of the storage medium.

15. A restoration apparatus for removing surface defects that exist in a top surface layer of an optical storage medium, the restoration apparatus comprising:

- means for retaining an optical storage medium in at least partial fluid communication with a fluid restoration material and in a manner that permits free rotation of the storage medium;
- a polishing head having a surface to which can be selectively attached restoration materials that include at least one of the following: an abrasive material and a polishing material;
- means for operatively manipulating the polishing head and the selectively attached restoration material against at least a portion of the surface of the optical storage medium; and
- an arm assembly having an interior housing sized and shaped so as to contain the polishing head and the polishing head manipulation means, and wherein the arm assembly is movably attached to a support surface so that the arm assembly can be used to selectively place the polishing head, and the selectively attached restoration material, against at least a portion of the surface of the optical storage medium.

* * * * *